(12) United States Patent
Smith et al.

(10) Patent No.: US 11,168,441 B2
(45) Date of Patent: *Nov. 9, 2021

(54) PROCESS FOR PRODUCING POLYVINYL ALCOHOL ARTICLES

(71) Applicant: Lakeland Industries, Inc., Ronkonkoma, NY (US)

(72) Inventors: Novis Smith, Philadelphia, PA (US); Charles Roberson, Greensboro, NC (US)

(73) Assignee: Lakeland Industries, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,536

(22) Filed: Oct. 24, 2017

(65) Prior Publication Data

US 2018/0171545 A1 Jun. 21, 2018

Related U.S. Application Data

(63) Continuation of application No. 13/533,392, filed on Jun. 26, 2012, now Pat. No. 9,797,073, which is a
(Continued)

(51) Int. Cl.
*D06N 3/00* (2006.01)
*D06C 7/00* (2006.01)
(Continued)

(52) U.S. Cl.
CPC ......... *D06N 3/0011* (2013.01); *B29C 35/049* (2013.01); *B29C 59/00* (2013.01); *B29C 71/0009* (2013.01); *B32B 27/08* (2013.01); *B32B 27/306* (2013.01); *B32B 27/32* (2013.01); *D04H 13/00* (2013.01); *D06B 1/00* (2013.01); *D06C 7/00* (2013.01); *D06M 11/05* (2013.01); *D06M 11/84* (2013.01); *D06M 15/00* (2013.01); *D06M 16/00* (2013.01); *D06N 3/00* (2013.01);
(Continued)

(58) Field of Classification Search
USPC .......................................... 442/101; 428/323
See application file for complete search history.

(56) References Cited

U.S. PATENT DOCUMENTS 3,322,593 A 5/1967 Conti
3,413,229 A 11/1968 Bianco et al.
(Continued)

FOREIGN PATENT DOCUMENTS

CN 1352710 A 6/2002
GB 1187690 4/1970
(Continued)

OTHER PUBLICATIONS

USPTO; Non-Final Office Action dated Jan. 18, 2012 in U.S. Appl. No. 13/135,917.
(Continued)

*Primary Examiner* — Lynda Salvatore
(74) *Attorney, Agent, or Firm* — Snell & Wilmer L.L.P.

(57) ABSTRACT

The present invention provides a process for modifying the surface of a polyvinyl alcohol film or fabric by applying heat and pressure to the film or fabric to increase the moisture on the surface which is held by the fabric and to coalesce the surface fibers and reduce the porosity of the surface.

15 Claims, 1 Drawing Sheet

Related U.S. Application Data continuation-in-part of application No. 13/135,917, filed on Jul. 18, 2011, now Pat. No. 8,293,664.

(51) Int. Cl.

| | | |
|---|---|---|
| *D04H 13/00* | (2006.01) | |
| *D06B 1/00* | (2006.01) | |
| *B29C 71/00* | (2006.01) | |
| *B32B 27/08* | (2006.01) | |
| *B32B 27/30* | (2006.01) | |
| *B32B 27/32* | (2006.01) | |
| *D06M 11/05* | (2006.01) | |
| *D06M 11/84* | (2006.01) | |
| *B29C 35/04* | (2006.01) | |
| *B29C 59/00* | (2006.01) | |
| *D06M 15/00* | (2006.01) | |
| *D06M 16/00* | (2006.01) | |
| *D06M 101/24* | (2006.01) | |
| *B29C 59/04* | (2006.01) | |

(52) U.S. Cl.
CPC ............ *B29C 59/04* (2013.01); *B32B 2255/10* (2013.01); *B32B 2255/26* (2013.01); *B32B 2307/73* (2013.01); *B32B 2437/00* (2013.01); *B32B 2571/00* (2013.01); *D06M 2101/24* (2013.01); *Y10T 442/2213* (2015.04); *Y10T 442/2221* (2015.04); *Y10T 442/656* (2015.04); *Y10T 442/679* (2015.04)

(56) References Cited

U.S. PATENT DOCUMENTS

| | | | |
|---|---|---|---|
| 3,856,598 A | 12/1974 | Gregorian et al. | |
| 3,859,125 A | 1/1975 | Miller et al. | |
| 3,870,542 A | 3/1975 | Ida et al. | |
| 3,874,964 A | 4/1975 | Cogliano et al. | |
| 4,147,844 A | 4/1979 | Babinsky et al. | |
| 4,272,851 A | 6/1981 | Goldstein | |
| 4,324,827 A | 4/1982 | Obayashi et al. | |
| 4,343,133 A | 8/1982 | Daniels et al. | |
| 4,409,761 A | 10/1983 | Bechtel | |
| 4,415,617 A | 11/1983 | D'Elia | |
| 4,639,390 A * | 1/1987 | Shoji .................. D04H 1/54 156/290 | |
| 4,713,068 A | 12/1987 | Wang et al. | |
| 4,726,986 A | 2/1988 | Cannady et al. | |
| 4,731,266 A | 3/1988 | Bonnebat et al. | |
| 4,772,510 A | 9/1988 | McClure | |
| 4,833,010 A | 5/1989 | Langley | |
| 4,855,178 A | 8/1989 | Langley | |
| 4,865,903 A | 9/1989 | Adiletta | |
| 4,879,165 A | 11/1989 | Smith | |
| 4,920,575 A | 5/1990 | Bartasis et al. | |
| 4,924,525 A | 5/1990 | Bartasis | |
| 4,970,105 A | 11/1990 | Smith, Jr. | |
| 4,981,738 A | 1/1991 | Farnworth et al. | |
| 5,002,820 A | 3/1991 | Bolton et al. | |
| 5,035,941 A | 7/1991 | Blackburn | |
| 5,037,700 A | 8/1991 | Davis | |
| 5,061,748 A | 10/1991 | Bolton et al. | |
| 5,082,721 A | 1/1992 | Smith, Jr. et al. | |
| 5,098,770 A | 3/1992 | Paire | |
| 5,124,208 A | 6/1992 | Bolton et al. | |
| 5,151,314 A | 9/1992 | Brown | |
| 5,162,148 A | 11/1992 | Boye et al. | |
| 5,166,007 A | 11/1992 | Smith et al. | |
| 5,236,769 A | 8/1993 | Paire | |
| 5,250,350 A | 10/1993 | Tung | |
| 5,266,167 A * | 11/1993 | Hess .................... D21G 1/0286 100/329 | |
| 5,491,022 A | 2/1996 | Smith | |
| 5,492,108 A | 2/1996 | Smith et al. | |
| 5,494,720 A | 2/1996 | Smith et al. | |
| 5,496,640 A | 3/1996 | Bolton et al. | |
| 5,554,667 A | 9/1996 | Smith et al. | |
| 5,667,885 A | 9/1997 | Nguyen et al. | |
| 5,688,577 A | 11/1997 | Smith et al. | |
| 5,692,935 A | 12/1997 | Smith | |
| 5,763,062 A | 6/1998 | Smith et al. | |
| 5,869,193 A | 2/1999 | Langley | |
| 6,045,900 A | 4/2000 | Haffner et al. | |
| 6,274,001 B1 * | 8/2001 | Mohan .................... D21G 1/00 100/38 | |
| 6,302,993 B1 | 10/2001 | Smith et al. | |
| 6,364,980 B1 | 4/2002 | Smith et al. | |
| 6,638,605 B1 | 10/2003 | Ankuda, Jr. et al. | |
| 6,671,031 B1 | 12/2003 | Nishimura | |
| 6,803,034 B2 | 10/2004 | DuVal et al. | |
| 6,808,791 B2 | 10/2004 | Curro et al. | |
| 7,093,307 B1 | 8/2006 | Smith | |
| 7,358,295 B2 | 4/2008 | Miller et al. | |
| 7,718,555 B1 | 5/2010 | Smith et al. | |
| 7,937,772 B1 | 5/2011 | Smith et al. | |
| 8,293,664 B1 | 10/2012 | Smith et al. | |
| 9,797,073 B1 * | 10/2017 | Smith .................. B29C 71/0009 | |
| 2001/0008695 A1 | 7/2001 | Bolton et al. | |
| 2002/0028876 A1 | 3/2002 | Jenkines et al. | |
| 2002/0091074 A1 | 7/2002 | Wooley et al. | |
| 2002/0115581 A1 | 8/2002 | DuVal et al. | |
| 2002/0155302 A1 | 10/2002 | Smith et al. | |
| 2002/0164465 A1 | 11/2002 | Curro et al. | |
| 2003/0003308 A1 | 1/2003 | Kashiba et al. | |
| 2003/0044579 A1 | 3/2003 | Bolton et al. | |
| 2003/0082445 A1 | 5/2003 | Smith et al. | |
| 2003/0082972 A1 | 5/2003 | Monfalcome, III et al. | |
| 2004/0096666 A1 | 5/2004 | Knox et al. | |
| 2004/0121678 A1 | 6/2004 | Baldwin, Jr. et al. | |
| 2006/0046022 A1 | 3/2006 | Bader et al. | |
| 2007/0172614 A1 | 7/2007 | Lee | |
| 2008/0038975 A1 | 2/2008 | Weiss et al. | |
| 2009/0061131 A1 | 3/2009 | Monfalcone, III et al. | |
| 2009/0294294 A1 | 12/2009 | Feng et al. | |
| 2009/0325447 A1 * | 12/2009 | Austin .................... B32B 27/12 442/328 | |
| 2010/0055472 A1 | 3/2010 | Bravet et al. | |
| 2015/0159322 A1 | 6/2015 | Smith et al. | |

FOREIGN PATENT DOCUMENTS

| | | |
|---|---|---|
| WO | 1994016585 A1 | 8/1994 |
| WO | 1994025189 A1 | 11/1994 |
| WO | 2000058539 A1 | 10/2000 |
| WO | 2003071012 A1 | 8/2003 |
| WO | 2004052522 A2 | 6/2004 |
| WO | 2013012854 A1 | 1/2013 |

OTHER PUBLICATIONS

USPTO; Final Office Action dated Apr. 6, 2012 in U.S. Appl. No. 13/135,917.
USPTO; Notice of Allowance dated Jun. 14, 2012 in U.S. Appl. No. 13/135,917.
PCT; International Search Report and Written Opinion dated Dec. 7, 2012 in corresponding International Application No. PCT/US2012/047047.
PCT; International Preliminary Report on Patentability dated Jan. 21, 2014 in corresponding International Application No. PCT/US2012/047047.
USPTO; Non-Final Office Action dated Aug. 27, 2015 in U.S. Appl. No. 13/317,965.
USPTO; Final Office Action dated Feb. 25, 2016 in U.S. Appl. No. 13/317,965.
USPTO; Notice of Allowance dated Aug. 11, 2016 in U.S. Appl. No. 13/317,965.
EPO; European Search Report dated Jul. 20, 2015 in European Application No. 12814529.9.
USPTO; Non-Final Office Action dated Dec. 18, 2015 in U.S. Appl. No. 13/533,392.

(56) References Cited

OTHER PUBLICATIONS

USPTO; Non-Final Office Action dated Jun. 21, 2016 in U.S. Appl. No. 13/533,392.
USPTO; Final Office Action dated Oct. 18, 2016 in U.S. Appl. No. 13/533,392.
USPTO; Non-Final Office Action dated Feb. 16, 2017 in U.S. Appl. No. 13/533,392.
USPTO; Notice of Allowance dated Jun. 21, 2017 in U.S. Appl. No. 13/533,392.

* cited by examiner

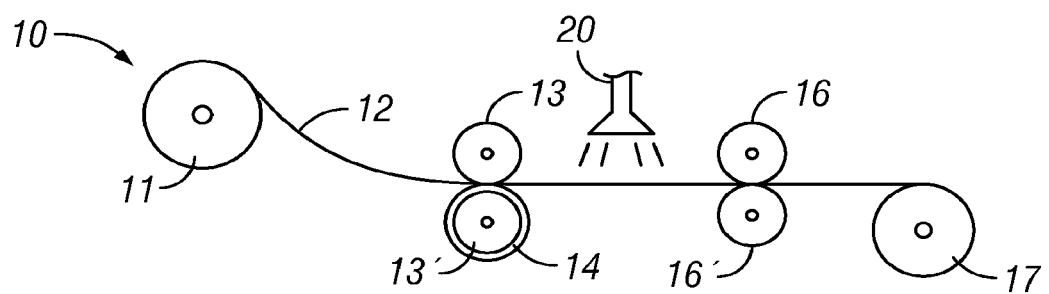

PROCESS FOR PRODUCING POLYVINYL ALCOHOL ARTICLES

CROSS-REFERENCE TO RELATED APPLICATIONS

This patent application is a continuation of U.S. patent application Ser. No. 13/533,392, filed Jun. 26, 2012, now U.S. Pat. No. 9,797,073, which is a continuation-in-part of U.S. application Ser. No. 13/135,917, filed Jul. 18, 2011, now U.S. Pat. No. 8,293,664, which applications are herein incorporated by reference in their entirety.

FIELD

The present invention relates to a process for producing modified polyvinyl alcohol film or fabric having a surface layer which is coalesced and has a surface porosity at a low desired level, more particularly, the process relates to applying heat and pressure to the film or fabric so as to increase the moisture on the surfaces which is held by the film or fabric and to coalesce the surface fibers and reduce the porosity of the surface.

BACKGROUND

The prior art has recognizes uses for polyvinyl alcohol compositions in the manufacture of water soluble useful articles. For example, U.S. Pat. No. 3,413,229 which is incorporated herein by reference, teaches the production of water soluble bags or pouches for which packets or the like are produced containing such materials as detergents, bleaches, insecticides, medicinals, chemicals, dyes, pigments, industrial additives and other materials. It is taught that the contents of the packets are dispersed merely by dropping the packets into water whereupon the bags dissolve and release their contents into aqueous dispersions. However, the referenced patent teaches the production of such films which are both hot and cold water soluble.

U.S. Pat. No. 3,859,125, which is incorporated herein by reference, teaches the production of layered articles which include coatings of polyvinyl alcohol. The subject reference teaches coating polyvinyl alcohol on a paper membrane whereby it is taught that the coated paper is soluble in either high or low temperature water. Similarly, U.S. Pat. No. 4,343,133 teaches the coating of polyvinyl alcohol onto a non-woven fiber sheet impregnated with lattices of polyvinyl acetate in the manufacture of a pre-moistened towelette which can be disposed of by flushing in plain water without danger of clogging a plumbing system.

Both U.K. Patent No. 1,187,690 and Japanese Patent No. 72041741, which are incorporated herein by reference, teach the production of stand alone polyvinyl alcohol films which are water soluble. The U.K. patent teaches the production of hospital bags and packaging material for such products as detergents and agricultural chemicals while the Japanese patent teaches the use of polyvinyl alcohol films to make laundry bags which dissolve releasing soiled garments contained therein. However, neither reference teaches the unique films of the present invention which can be configured into useful garments and like materials.

SUMMARY

The process comprises passing a film of polyvinyl alcohol (PVOH) having a moisture content of at least 5-10% through a pair of calender rolls with a heated calender role to provide increased moisture at the surface of the PVOH film to coalesce the surface and lower its porosity.

Advantageously, the unheated opposing calender roll has a softer surface than that of the heated calender roll.

According to a further embodiment of the invention both calender rolls can be heated so that both surface of the PVOH film are coalesced and have a reduced porosity.

It is a general object of the invention to provide a process for modifying at least one surface of a PVOH film based on the moisture content on its surface so to alter the surface and provide a reduced porosity.

It is another object of the invention to provide a process for lowering the surface porosity of spunlaced non woven PVOH fabric while not detracting from its other desirable properties such as strength and abrasion resistance.

It is a further object of the invention to modify a surface of a PVOH non woven fabric by controlling the moisture content of the non woven PVOH fabric before processing it through a heated calender roll.

These and other objects and advantages will be noted by a reading of the Preferred Embodiments of the invention and the drawing.

BRIEF DESCRIPTION OF THE DRAWINGS

FIG. 1 is a schematic of the apparatus used in the present invention.

DESCRIPTION

The fabric contains at least 5-10% by weight water under normal indoor conditions when received and is maintained in this state. These conditions are normal air conditioned/relative humidity in most modern mills. There needs to be certain the percentage of contained moisture in order to achieve repeatable results under consistent process settings as the fabric is hot calendered. This moisture content of at least 5-10% is sufficient to reproducibly provide increased moisture at the surface of the PVOH film or fabric so that the hot calender roll with pressure forces the coalescing of the surface fibers to restrict the surface porosity to the low desired level. No steam is required or extra water is required under these conditions to achieve the degree of coalescing of the fibers and the lowering of the porosity.

In order to make the process less susceptible to changes in the fabric moisture content, the calender rolls should be composed of a heated metal roll, preferably steel, and an unheated counter roll with a surface coated or covered with an appropriate high melting hard tough polymer film such as silicone rubber polyamide, Teflon or polyurethane. The surface of this polymer film or coating will result in a wider nip print resulting in an increased contact area between the heated metal and coated rolls. The increased contact between the two rolls will result in increased contact between the heated roll and the fabric which will improve the heat and pressure transfer of moisture to the surface of the fabric. Additionally, by employing a softer, unheated opposing or counter roll will result in a small difference in the differential stretch between the two sides of the fabric which improves the quality (controlled reduced porosity) of the film formation on both sides of the fabric surface. The softness of the coated roll can be altered to change the stretch differential of the surface of the fabric and the reduced porosity obtained of the fabric, and to modify the properties of the resulting processed fabric. In essence each film coating on the roll and the thickness of that coating will determine a different foot print on the surface of the PVOH fabric surface.

Variations in the process can be readily and practically accomplished by heating both rolls, by heating and coating both rolls, by using the preferred configuration of heating the uncoated steel roll alone and not heating the opposing coated roll, and varying the pressure and varying the line speed. The process is very flexible and small adjustments in line speed, roll pressure, roll temperature and diameter of the rolls allow for variations in moisture content of the PVOH fabric and allows fine tuning of the porosity of both of the fabric surfaces to achieve the desired air permeation properties.

Once the PVOH fabric exits from the calender roll, it must be quickly cooled so as not to disturb low porosity surface film which has been formed. The fabric is preferentially passed over a chill roll and not distorted until the fabric is cool and the surface has been hardened. Minimum tension is used after the calender roll.

Further variation can be accomplished by increasing the moisture content of the initial fabric by conditioning the fabric in a humid environment so that the moisture content is greater than the 5-10% by weight of water which it normally contains, for example, about 11-15%. To modify the surface on the other side, the fabric from the take-up roll can be reversed and passed a second time through the apparatus.

The initial fabric to be treated can comprise polyvinyl alcohol or it can be laminated with another thermoplastic such as a polyolefin, preferably, polyethylene.

Polymer or sheet materials useful in practicing the present method comprise polyvinyl alcohol with or without acetyl groups, cross-linked or uncross-linked. The garments are comprised of polyvinyl alcohol homopolymer that has been highly crystallized by post drawing or heat annealing. Ideal for use in the present invention would be a highly crystallized, at least approximately 98% saponified polyvinyl acetate. Commercially, polyvinyl alcohol sold under the trademark Vinex 1003™ and 1002 ™ by Air Products could be used herein. Useful fibers are typically 0.4 to 7 mils. A commercially available product for use in the present invention is either type T-B (VEE 1290) or type T-5 (VPB 101) which are each available from Kuralon as its PVA fiber. This material is sold in 44 mm lengths. The T-B product is sized at 1.2 denier while the T-5 product is sold in 38 mm staple lengths of 1.5 denier.

The fabric useful in practicing the present invention can be constructed by any well known technique for making woven, non-woven, knitted or otherwise formed fabric. Such non-woven techniques useful in practicing the present invention include spun bonding, melt blowing or wet laying, hydro entangling with cold water and/or thermally bonding with 30-70% of the surface melted to form. When products are configured of sheets of suitable thermoplastic material, the sheets are approximately 1 to 6 mils in thickness and more preferably 1 to 3 mils in thickness and most preferably approximately 1.5 mils in thickness. Suitable non-woven fabric or sheets are approximately from 15 g/yd$^2$ to 200 g/yd$^2$ in weight and more preferably from 20 g/yd$^2$ to 70 g/yd$^2$ and most preferably from 25 g/yd$^2$ to 80 g/yd$^2$.

As noted previously, polymer or sheet material useful in practicing the present invention is comprised of polyvinyl alcohol with or without acetyl groups, cross-linked or uncross-linked. It is proposed that the polyvinyl alcohol be substantially fully hydrolyzed, that is, having 98% or greater hydrolyzed acetyl groups.

For the sake of adequate mechanical strength, in some cases the polyvinyl alcohol-based sheet material should have a degree of polymerization of at least 700 and no greater than approximately 1500. Ideally, such materials should have a degree of polymerization of approximately 900 and be substantially crystallized.

To enhance the manufacture of suitable polyvinyl alcohol resin-based materials, suitable quantities of a plasticizer may be necessary. It is contemplated that up to 15% (wt.) of a suitable plasticizer such as glycerin or polyethylene glycol may be employed to assist in providing a smooth melt extrusion from the polyvinyl alcohol-based pellets.

It was found that the manufactured fabric for use as disposable medical garments displayed nearly identical physical properties similar to fabric manufactured from polyethylene, polyester and polypropylene. However, the fabric manufactured was unaffected by cool or warm water (23°-37° C.) but when exposed to hot water (80°-90° C.), immediately dissolved.

The incorporation of a water repellent on or within the polyvinyl alcohol film or fabric is quite a useful adjunct to minimize surface attack by liquid moisture at a temperature lower than that at which solubility occurs. It has been found that even with polyvinyl alcohol films and fabrics which become water soluble only at elevated temperatures, when exposed to water, the surface of such material tends to take on a slick "feel" and the use of water repellents tends to minimize this effect. Suitable repellents include fluorocarbons offered by the 3M Co. sold under its trademarks FC 824 and 808. These materials are useful in the range of between 0.1 to 2.0% (wt.) based on the weight of the polyvinyl alcohol polymer.

Antimicrobial agents can add to the surface particularly for medical applications such as gowns, drapes, etc. Antimicrobials include GERM PATROL® sold by Germ Patrol, LLC, silanes, silver or copper antimicrobials, and the like.

As shown in FIG. 1, an apparatus (10) used in fabricating the modified surface of the PVOH comprises a fabric roller (11) wherein the fabric (12) is passed through calender rollers (13, 13$^1$). Roller (13) is a heated metal roller, preferably steel, and counter roller (13$^1$) is an unheated roller having a surface coating (14) of a high melting polymer film such as a polyamide, TEFLON®, polyurethane and silicon rubber wherein the surface is modified by the contact between the two rollers (13, 13$^1$) to increase the moisture at the surface to coalesce the fibers on the surface. The temperature of the heated roller (13) is generally about 120° to 190° C. The modified fabric then passes under a sprayer (20) which can spray an additive such as a water repellant, dye, anti-stat agent, etc. The fabric is then passed under chill rollers (16, 16$^1$) which are cooled by refrigerated water and then onto the take-up roller (17).

To modify the other surface of the PVOH fabric the process can be run a second time or the apparatus can be modified by providing a heated roller for the other side.

The following Example is merely illustrative of the invention and modifications are within those skilled in the art.

EXAMPLE

A series of trial runs were made using a 600 mm rolls of PVOH having a length of 600 mm with a thickness which varied at 0.52 mm to 0.45 mm with an outside moisture reading of 6.50%.

Tests 5 and 6 were run on the same apparatus and tests 8 and 9 were run on the same apparatus.

The results are as follows:

Process Data

| FIRST PASS | | | | | | |
|---|---|---|---|---|---|---|
| Test No. | Set Temp | Roll Temp | Air Perm | Thickness | Speed | Pressure |
| 1 | 145° C. | 130° C. | 87.93 | 6.2 mil | 20.2 m/min. | 200 N/mm |
| 2 | 145° C. | 130° C. | 87.93 | 6.2 mil | 20.2 m/min. | 200 N/mm |
| 3 | 145° C. | 138.6° C. | | | 50.0 m/min. | 250 N/mm |
| 4 | 170° C. | 147° C. | | | 50.0 m/min. | 250 N/mm |
| 5 | 190° C. | 161° C. | 26 cfm | 5.4 mil | N/A | N/A |
| 6 | 190° C. | 161° C. | | | 50.1 m/min. | 250 N/mm |
| 7 | 190° C. | 170° C. | 5.58 cfm | 3.81 mil | | |
| 8 | Preheat | 170° C. | 170.0 cfm | 4.15 mil | | |
| 9 | Preheat | 170° C. | 7.55 | 3.87 ml | | |
| 10 | 190° C. | 170° C. | 6.82 | 3.42 mil | | |

| SECOND PASS (reverse roll sequence) | | | | |
|---|---|---|---|---|
| Test No. | Set Temp | Roll Temp | Air Perm | Thickness |
| 1 | 145° C. | 130° C. | 18.0 cfm | 3.87 mil |
| 2 | 145° C. | 130° C. | 54.1 cfm | 4.21 mil |
| 3 | 150° C. | 130° C. | | |
| 4 | 170° C. | 147.0° C. | 24.6 cfm | 5.4 mil |
| 5 | N/A | N/A | N/A | N/A |
| 6 | 190° C. | 161° C. | 23 cfm | 3.6 mil | face as a porosity that is the same as the porosity of the starting polyvinyl alcohol material.

What is claimed is:

1. A polyvinyl alcohol article comprising:
a first outer surface;
a second outer surface opposite the first outer surface, wherein the polyvinyl alcohol article is made by:
subjecting a starting material of polyvinyl alcohol film or fabric having a water content of from 5 to 15 percent by weight to heat and pressure conditions by passing the starting material through a pair of opposed calendar rollers to cause the first outer surface to coalesce and have a reduced surface porosity relative to the starting material while the second outer surface has a surface porosity different than that of the first outer surface, wherein the reduced surface porosity is uniform extending continuously along the first outer surface.

2. The polyvinyl alcohol article as recited in claim 1 wherein during the step of subjecting, one of the rollers is a heated roller the other of the roller is an unheated roller.

3. The polyvinyl alcohol article as recited in claim 1 wherein one of the calendar rollers comprises a surface coating of a high melting polymer film.

4. The polyvinyl alcohol article as recited in claim 1 wherein after the step of subjecting, cooling the polyvinyl alcohol material.

5. The polyvinyl alcohol article as recited in claim 4 wherein the step of cooling comprises passing the polyvinyl alcohol material through opposed cooled calendar rollers.

6. The polyvinyl alcohol article as recited in claim 1 further comprising an additive disposed onto the first outer surface having the reduced surface porosity.

7. The polyvinyl alcohol article as recited in claim 6 wherein the additive is selected from the group consisting of an antimicrobial agent, anti-static agent, water repellant, a dye, and combinations thereof.

8. The polyvinyl alcohol article as recited in claim 1, wherein the first surface has a reduced porosity relative to the starting polyvinyl alcohol material and the second surface as a porosity that is the same as the porosity of the starting polyvinyl alcohol material.

9. A polyvinyl alcohol fabric having a first outer surface with reduced porosity relative to a starting polyvinyl alcohol material, the polyvinyl alcohol fabric prepared by the process of:
applying heat and pressure to a staring polyvinyl alcohol material comprising up to about 10 percent by weight water by a pair of opposed calendar rollers to cause only the fabric first outer surface to coalesce and have a reduced porosity relative to the staring polyvinyl alcohol material, wherein reduced porosity is uniform and extends continuously along the first outer surface; and
subjecting the polyvinyl alcohol fabric to a cooling process in a manner that does not change the reduced porosity of the fabric first outer surface, wherein the polyvinyl alcohol fabric has a second outer surface that is opposite the first outer surface and that has a porosity similar to the starting polyvinyl alcohol material.

10. The polyvinyl alcohol fabric as recited in claim 9 wherein during the step of applying, one of the opposed calendar rollers contacting the fabric first outer surface is heated, and the other calendar roller contacting the fabric second outer surface has a reduced temperature relative to the heated calendar roller.

11. The polyvinyl alcohol fabric as recited in claim 9, wherein the step of subjecting comprises passing the polyvinyl alcohol fabric through calendar rollers, wherein at least one of the calendar rollers is has a temperature below ambient temperature.

12. The polyvinyl alcohol fabric as recited in claim 9 wherein the fabric comprises a laminate of another thermoplastic material.

13. The polyvinyl alcohol fabric as recited in claim 9 wherein the starting polyvinyl alcohol material has a water content of about 5 to 15 percent by weight before the step of applying.

14. The polyvinyl alcohol fabric as recited in claim 9 wherein the starting polyvinyl alcohol material has 98% or greater hydrolyzed acetyl groups.

15. The polyvinyl alcohol fabric as recited in claim 9 further comprising an additive present on the first outer surface of the fabric having the reduced porosity.

\* \* \* \* \*